United States Patent [19]
Bhatia et al.

[11] Patent Number: 5,313,413
[45] Date of Patent: May 17, 1994

[54] APPARATUS AND METHOD FOR PREVENTING I/O BANDWIDTH LIMITATIONS IN FAST FOURIER TRANSFORM PROCESSORS

[75] Inventors: Rohit Bhatia, Vancouver, Wash.; Masaru Furuta, Tenri, Japan

[73] Assignees: Sharp Microelectronics Technology Inc., Camas, Wash.; Sharp Kabushiki Kaisha, Osaka, Japan

[21] Appl. No.: 27,934

[22] Filed: Mar. 8, 1993

Related U.S. Application Data

[63] Continuation of Ser. No. 687,289, Apr. 18, 1991, abandoned.

[51] Int. Cl.⁵ .............................................. G06F 15/00
[52] U.S. Cl. .................................................... 364/726
[58] Field of Search ................... 364/724.01, 725, 726, 364/728.01, 730, 736

[56] References Cited

U.S. PATENT DOCUMENTS

| | | | |
|---|---|---|---|
| 4,138,730 | 2/1979 | Ali | 364/726 |
| 4,547,862 | 10/1985 | McIver et al. | 364/726 |
| 4,601,006 | 7/1986 | Liu | 364/726 |
| 4,689,762 | 8/1987 | Thibodeau, Jr. | 364/726 |
| 4,977,533 | 12/1990 | Miyabayashi | 364/726 |
| 5,042,000 | 8/1991 | Baldwin | 364/726 |
| 5,109,524 | 4/1992 | Wagner et al. | 395/800 |

Primary Examiner—Jerry Smith
Assistant Examiner—Choung D. Ngo
Attorney, Agent, or Firm—Kenneth M. Kaslow

[57] ABSTRACT

A Quasi Radix-16 Butterfly comprises an radix-4 butterfly processor and on-board memory with external memory addressing changes from a conventional radix-4 butterfly processor. On-chip cache memory is included to store data outputs of the radix-4 butterfly processor for application as data inputs to the radix-4 butterfly processor in a second series of butterfly operations to implement high-speed processing that is maximally execution-bound.

12 Claims, 16 Drawing Sheets

QUASI RADIX-16 BUTTERFLY HARDWARE IMPLEMENTATION
(PRIOR ART)

A RADIX-2 BUTTERFLY

A RADIX-4 BUTTERFLY

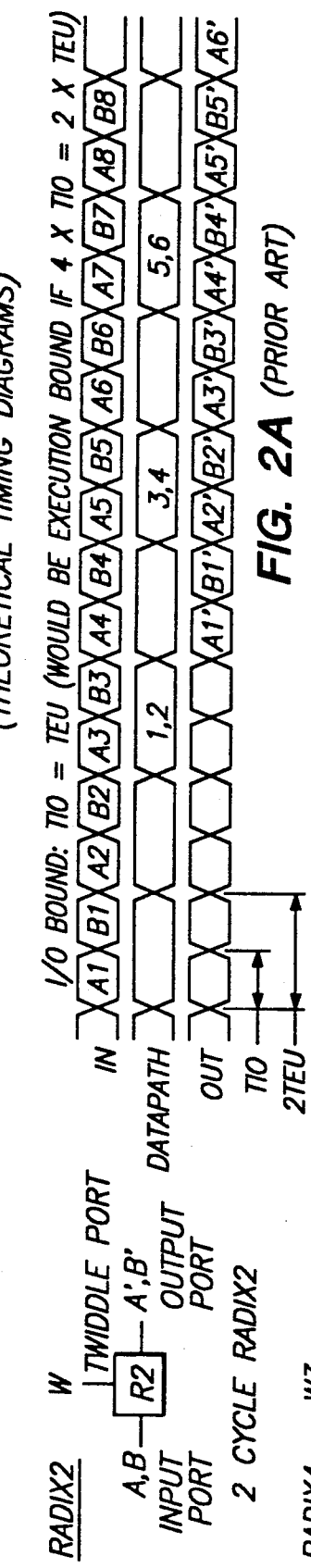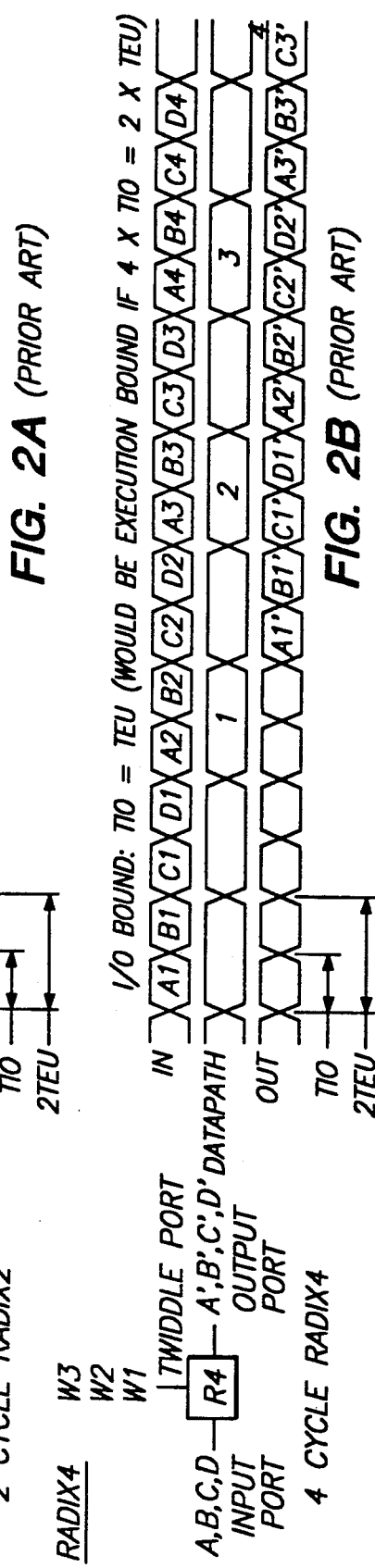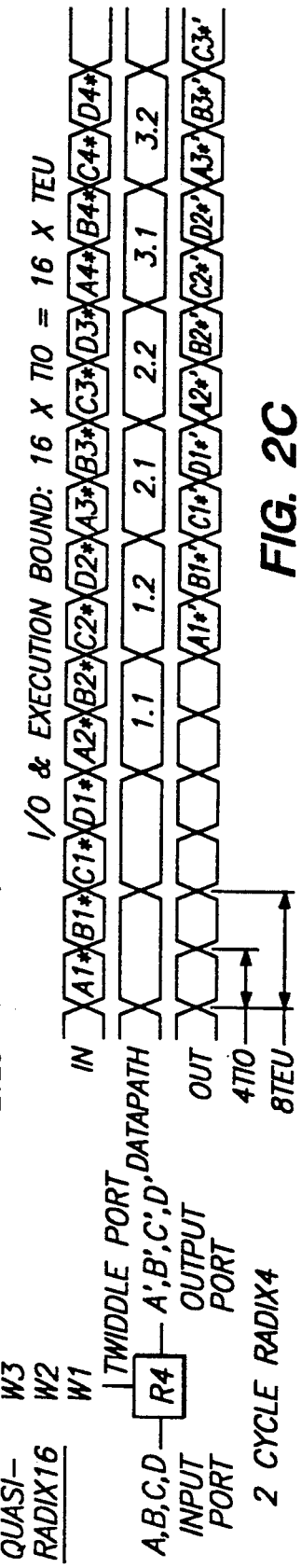
FIG. 2A (PRIOR ART)
FIG. 2B (PRIOR ART)
FIG. 2C

BASIC DATA FLOW IN QR16

QUASI RADIX-16 BUTTERFLY HARDWARE IMPLEMENTATION
(PRIOR ART)

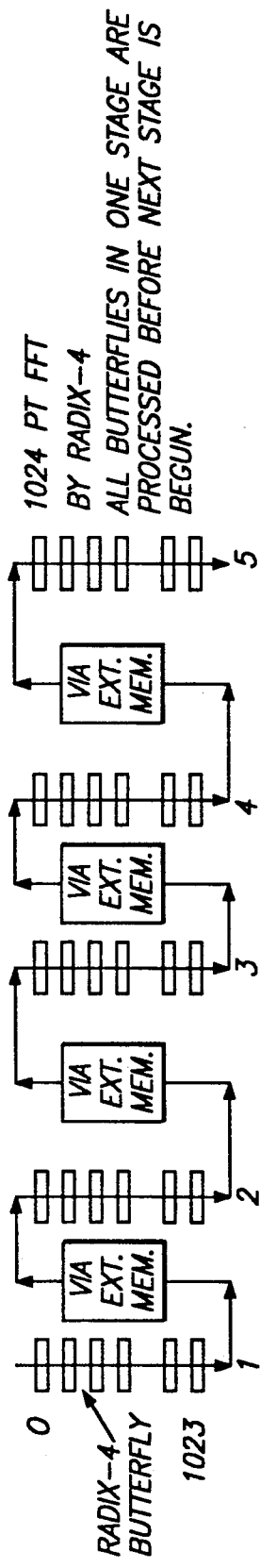
FIG. 4A (PRIOR ART)
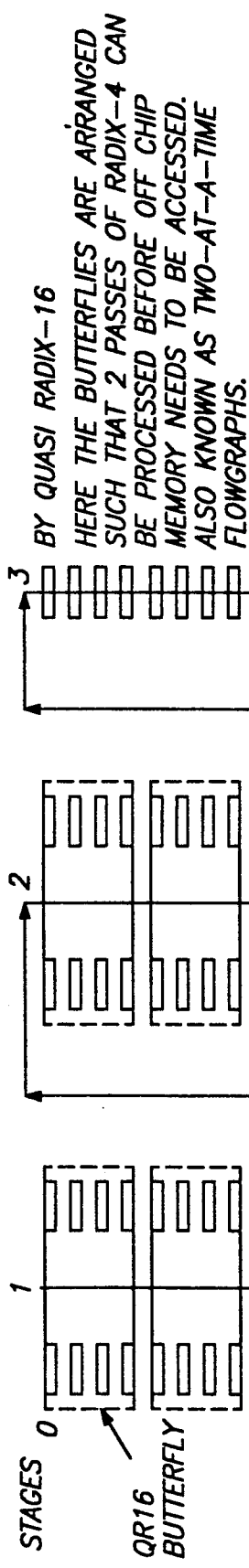
FIG. 4B DIFFERENCES IN RADIX-4 & QR16 BUTTERFLY SEQUENCE FOR 1K FFT

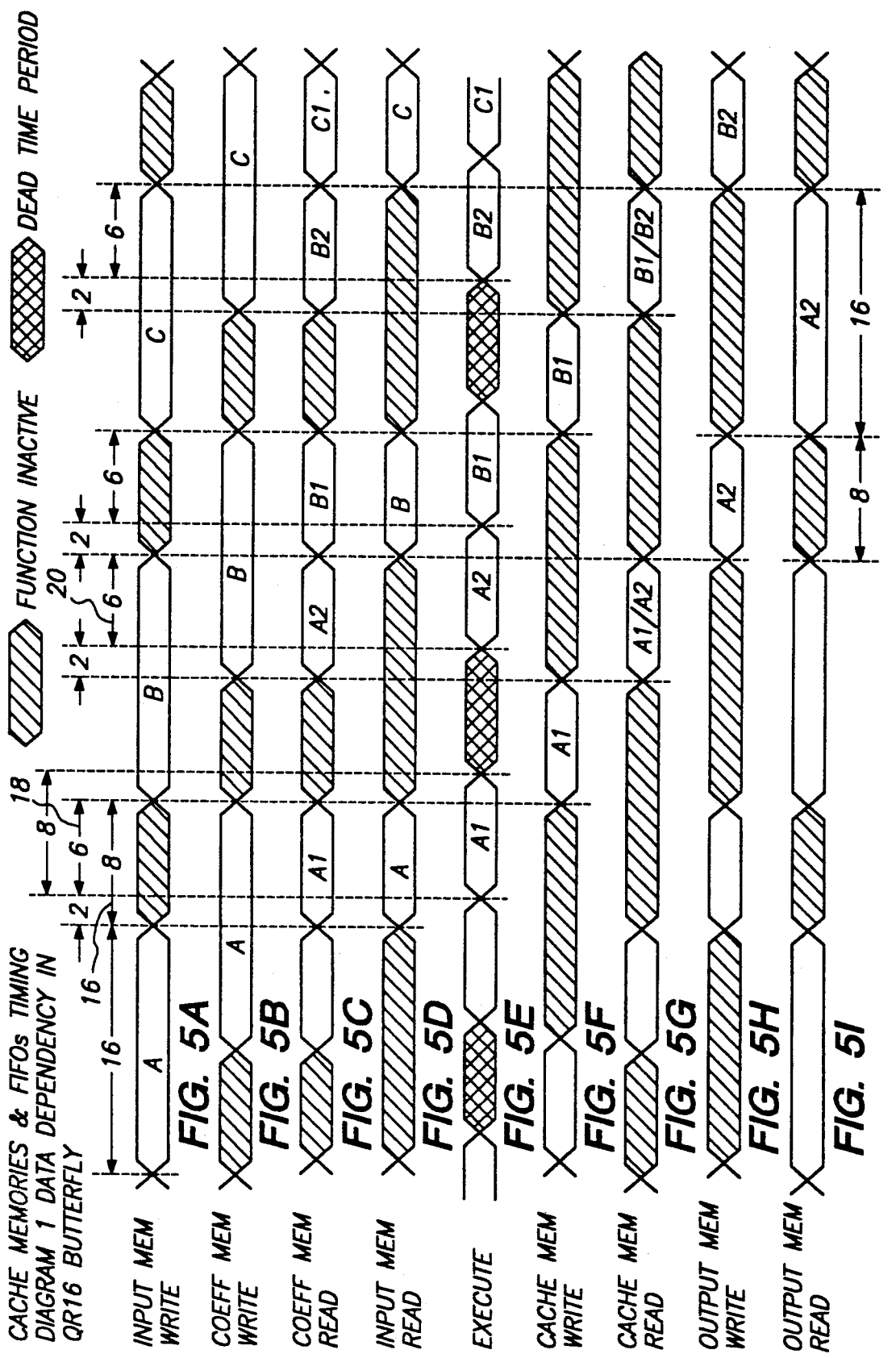

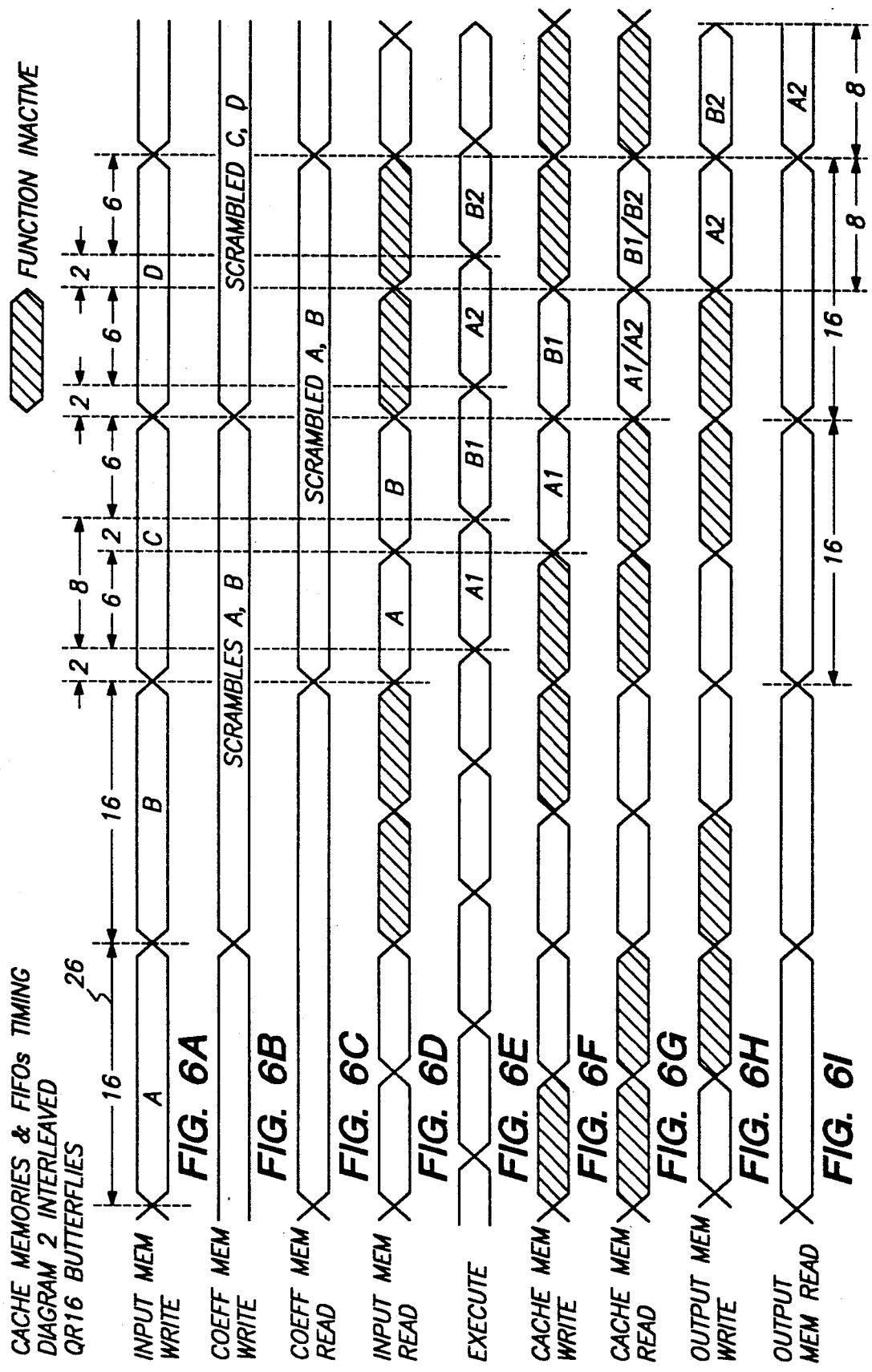

DATA FLOW IN INTERLEAVED QR16 SCHEME

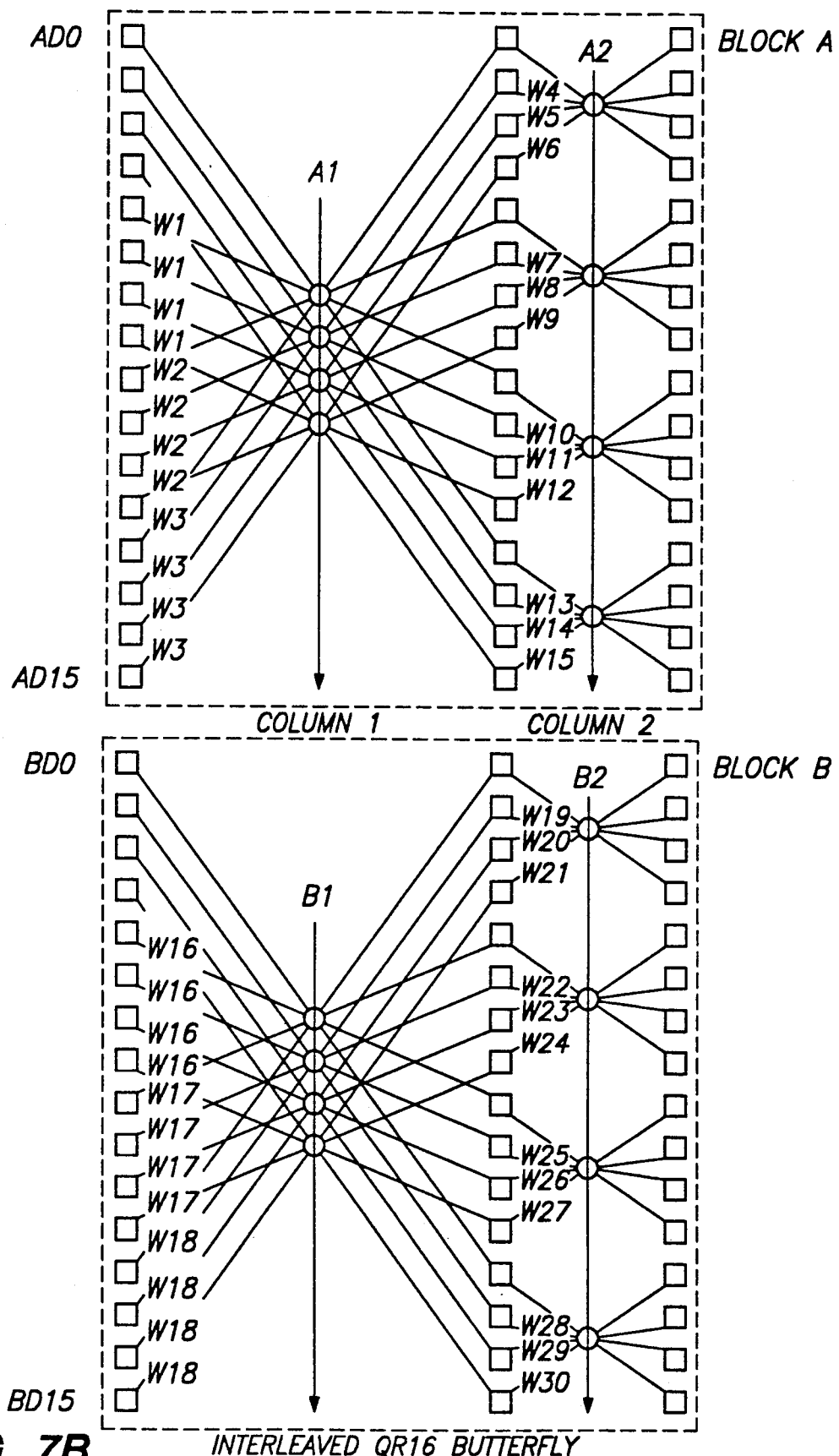
FIG. 7B  INTERLEAVED QR16 BUTTERFLY

TWIDDLE SEQUENCING

SYSTEM ENVIRONMENT

NOTES: (1) ADD: ROW ADDRESS OF MEMORY
       (2) A,B: LEFT BANK OF MEMORY— FOR COMPLEX DATA, REAL DATA IS WRITTEN IN BANK A AND IMAGINARY DATA IN BANK B
       (2) C,D: RIGHT BANK OF MEMORY— FOR COMPLEX DATA, REAL DATA IS WRITTEN IN BANK C AND IMAGINARY DATA IN BANK D

INPUT MEMORY WRITE SEQUENCES

SEQUENCE 1

| ADD. | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A,B | 0 | 2 | 4 | 6 | 8 | A | C | E | 10 | 12 | 14 | 16 | 18 | 1A | 1C | 1E |
| C,D | 1 | 3 | 5 | 7 | 9 | B | D | F | 11 | 13 | 15 | 17 | 19 | 1B | 1D | 1F |

*FIG. 11A*

SEQUENCE 2

| ADD. | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A,B |   |   |   |   |   |   |   |   |   |   |   |   |   |   |   |   |
| C,D | 0 | 2 | 1 | 3 | 4 | 6 | 5 | 7 | 8 | A | 9 | B | C | E | D | F |

*FIG. 11B*

NOTES: (1) ADD: ROW ADDRESS OF MEMORY
(2) A,B: LEFT BANK OF MEMORY– FOR COMPLEX DATA, REAL DATA IS WRITTEN IN BANK A AND IMAGINARY DATA IN BANK B
(2) C,D: RIGHT BANK OF MEMORY– FOR COMPLEX DATA, REAL DATA IS WRITTEN IN BANK C AND IMAGINARY DATA IN BANK D

COEFFICIENT MEMORY WRITE SEQUENCES

SEQUENCE 1

| ADD. | 0 | 1 | 2 | 3 | 4 | 5 | 6 | 7 | 8 | 9 | A | B | C | D | E | F | 10 | 11 | 18 | 19 |
|---|---|---|---|---|---|---|---|---|---|---|---|---|---|---|---|---|---|---|---|---|
| A,B | 0 | 2 | 4 | 6 | 8 | A | C | E | 10 | 12 | 14 | 16 | 18 | 1A | 1C | 1E | | | | |
| C,D | 1 | 3 | 5 | 7 | 9 | B | D | F | 11 | 13 | 15 | 17 | 19 | 1B | 1D | 1F | | | | |

FIG. 12A

SEQUENCE 2

| ADD. | 0 | 1 | 2 | 3 | 4 | 5 | 6 | 7 | 8 | 9 | A | B | C | D | E | F | 10 | 11 | 18 | 19 |
|---|---|---|---|---|---|---|---|---|---|---|---|---|---|---|---|---|---|---|---|---|
| A,B | 0 | | | | | | | | | | | | | | | | | | | |
| C,D | 0 | 2 | 1 | 3 | 4 | 6 | 5 | 7 | 8 | A | 9 | B | C | E | D | F | | | | |

FIG. 12B

SEQUENCE 3

| ADD. | 0 | 1 | 2 | 3 | 4 | 5 | 6 | 7 | 8 | 9 | A | B | C | D | E | F | 10 | 11 | 18 | 19 |
|---|---|---|---|---|---|---|---|---|---|---|---|---|---|---|---|---|---|---|---|---|
| A,B | 0 | | | | 5 | 8 | | B | E | | | | | 1B | | 1E | 0 | 2 | 10 | 12 |
| C,D | 4 | | 6 | 7 | 9 | A | C | D | F | 14 | 16 | 17 | 19 | 1A | 1C | 1D | 1F | 1 | 3 | 11 | 13 |

FIG. 12C

NOTES: (1) ADD: ROW ADDRESS OF MEMORY
(2) A,B: LEFT BANK OF MEMORY— FOR COMPLEX DATA, REAL DATA IS WRITTEN IN BANK A AND IMAGINARY DATA IN BANK B
(2) C,D: RIGHT BANK OF MEMORY— FOR COMPLEX DATA, REAL DATA IS WRITTEN IN BANK C AND IMAGINARY DATA IN BANK D

COEFFICIENT MEMORY WRITE/READ SEQUENCES

WRITE SEQUENCE

| ADD. | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A,B | 0 | 8 | 5 | D | 2 | A | 7 | F | 10 | 18 | 15 | 1D | 12 | 1A | 17 | 1F |
| C,D | 4 | C | 1 | 9 | 6 | E | 3 | B | 14 | 1C | 11 | 19 | 16 | 1E | 13 | 1D |

FIG. 13A

READ SEQUENCE

| ADD. | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A,B | 0 | 2 | 5 | 7 | 8 | A | D | F | 10 | 12 | 15 | 17 | 18 | 1A | 1D | 1F |
| C,D | 1 | 3 | 4 | 6 | 9 | B | C | E | 11 | 13 | 14 | 16 | 19 | 1B | 1C | 1E |

FIG. 13B

NOTES: (1) ADD: ROW ADDRESS OF MEMORY
(2) A,B: LEFT BANK OF MEMORY– FOR COMPLEX DATA, REAL DATA IS WRITTEN IN BANK A AND IMAGINARY DATA IN BANK B
(2) C,D: RIGHT BANK OF MEMORY– FOR COMPLEX DATA, REAL DATA IS WRITTEN IN BANK C AND IMAGINARY DATA IN BANK D

OUTPUT MEMORY READ SEQUENCES

SEQUENCE 1

| ADD. | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A,B | 0 | 1 | 4 | 5 | 8 | 9 | C | D | 10 | 11 | 14 | 15 | 18 | 19 | 1C | 1D |
| C,D | 2 | 3 | 6 | 7 | A | B | E | F | 12 | 13 | 16 | 17 | 1A | 1B | 1E | 1F |

FIG. 14A

SEQUENCE 2

| ADD. | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A,B | 0 | 2 | 4 | 6 | 8 | A | C | E | 10 | 12 | 14 | 16 | 18 | 1A | 1C | 1E |
| C,D | 1 | 3 | 5 | 7 | 9 | B | D | F | 11 | 13 | 15 | 17 | 19 | 1B | 1D | 1F |

FIG. 14B

SEQUENCE 3

| ADD. | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A,B | 0 | 8 | 1 | 9 | 2 | A | 3 | B | 10 | 18 | 11 | 19 | 12 | 1A | 13 | 1B |
| C,D | 4 | C | 5 | D | 6 | E | 7 | F | 14 | 1C | 15 | 1D | 16 | 1E | 17 | 1F |

FIG. 14C

APPARATUS AND METHOD FOR PREVENTING I/O BANDWIDTH LIMITATIONS IN FAST FOURIER TRANSFORM PROCESSORS

RELATED APPLICATIONS

This is a continuation of co-pending application Ser. No. 07/687,289 filed on Apr. 18, 1991 and now abandoned.

BACKGROUND OF THE INVENTION

1. Field of the Invention

The present invention relates to a LSI butterfly processor and method for high performance Fast Fourier Transform (FFT) processors.

2. Description of Related Art

With the present state of the art in VLSI technology, the speed of VLSI computing structures is typically limited by the data bandwidth of a VLSI array processor and not by silicon circuits. The data bandwidth is directly related to the number of input and output (I/O) pins. The level of integration has reached a point where, due to limited I/O bandwidth, it is not possible to achieve 100% execution hardware utilization without increasing the number of I/O pins significantly. In such a situation, the design of VLSI processors should aim for minimization of the undesirable effects of limited I/O bandwidth while preserving the tremendous advantages of large computation arrays.

Early integrated FFT processors were based on a radix-2 "butterfly" as illustrated in FIG. 1a, to keep the amount of hardware required on a single chip to a minimum. A "butterfly" is a set of arithmetic operations commonly used in digital signal processing. Recently, due to advancing technology, several radix-4 butterfly-based processors have been disclosed. These processors are a logical evolutionary advance from radix-2 processors that takes advantage of a higher level of integration and thus more silicon area. Each radix-4 butterfly requires four data inputs, three 'twiddle' inputs (i.e. angular velocity information), and four data outputs, as shown in FIG. 1b. A typical multi-cycle radix-4 butterfly processor includes one complex data input port, one complex twiddle port and one complex data output port, where each port can be 32 to 48 bits wide in such fixed point processors. Thus, for a radix-4 butterfly processor there is already a large number of I/O pins. Also, it is difficult to conceive of a radix-8 butterfly processor because there is a tremendous increase in the amount of hardware required for a radix-8 butterfly processor as compared with a radix-4 butterfly processor. The term "butterfly" processor is used herein to conveniently designate the circuit module, described in detail later herein, which includes a plurality of fan-in inputs and a plurality of fan-out outputs in the schematic representation.

It is desirable to compute Fast Fourier transforms (FFTs) using as high a radix as possible to alleviate the I/O bandwidth problem in VLSI FFT processors. The use of higher radices is even more desirable for FFT processors designed to handle exceptionally large FFT sizes e.g., 16 million data-point FFT. The I/O bandwidth problem in high performance FFT processors is illustrated in the timing diagrams of FIGS. 2a and 2b. Let $T_{io}$ be the I/O cycle time and $T_{eu}$ be the execution unit pipeline cycle time. For a dual radix-2 butterfly, four I/O cycles are performed to fetch the data (A1, B1, A2, B2), as shown in FIG. 2a. The datapath then performs two butterfly operations (1,2) on fetched data in two cycles. If $T_{io}$ is equal to $T_{eu}$ then the datapath cannot be kept busy continuously and is I/O bound as indicated by the blank cycles in the datapath timing waveform of FIG. 2a. As indicated in FIG. 2a, to make the datapath execution bound, $4 \times T_{io} = 2 \times T_{eu}$ i.e., the I/O cycle time should have to be one-half the execution pipeline cycle time. FIG. 2b illustrates the same situation for a radix-4 butterfly. Here again four I/O cycles are required to fetch the data for a single radix-4 butterfly. If it is assumed that the datapath can execute a radix-4 butterfly every two cycles, then once again $T_{io}$ would have to be ($\frac{1}{2}$) $T_{eu}$ to make the datapath execution bound. This then is the I/O bandwidth problem in high performance pipelined FFT processors with a limited number of I/O ports, specifically three complex ports (namely, an input port, a twiddle port and an output port as indicated in FIG. 2).

SUMMARY OF THE INVENTION

In accordance with the illustrated embodiment of the present invention, radix-16 butterfly hardware is implemented using a multi-cycle radix-4 butterfly-based circuit module that uses relatively fewer I/O pins and yet relieves the I/O bandwidth problem to achieve significantly higher throughput compared with a conventional radix-4 butterfly implementation. This invention, henceforth referred to as the Quasi Radix-16 (QR16) butterfly processor, includes a radix-4 butterfly processor and on-board memory with some minor external memory addressing changes from a conventional radix-4 butterfly processor. The QR16 performs a quasi radix-16 butterfly in two columns of four radix-4 butterfly operations as illustrated in FIG. 1c. On-chip cache memory is included to store data outputs of the first column of radix-4 butterflies for use as data inputs in the radix-4 butterfly operations of the second column to implement high-speed processing that is maximally execution-bound, as illustrated in FIG. 2c.

BRIEF DESCRIPTION OF THE DRAWINGS

FIGS. 2a–c are timing diagrams for the associated radix-n butterfly processors that illustrate input/output bandwidth and execution limitations;

FIGS. 4a and 4b are pictorial representations of the processing sequences for a conventional radix-4 processor and the quasi radix-16 processor of the present invention;

FIGS. 5a–i are timing diagram illustrating the impact of data dependencies in a datapath on the processing speed attributable to the quasi radix-16 processor of the present invention;

FIGS. 6a–i are charts illustrating the data processing for maximum execution utilization of a quasi radix-16 processor according to the present invention;

FIG. 7b is a simplified schematic diagram illustrating an interleaved quasi radix-16 butterfly operation with multiple twiddle inputs for operation as illustrated in FIG. 4b according to the present invention;

FIGS. 11a and 11b are charts illustrating the input memory storage scheme for data inputs;

FIGS. 12a–c are charts illustrating the coefficient memory storage scheme for twiddle input data;

FIGS. 13a and 13b are charts illustrating the cache memory storage scheme; and

FIGS. 14a–c are charts illustrating the output data memory scheme.

DESCRIPTION OF THE PREFERRED EMBODIMENT

In general, a Fourier transform of data points representing a complex function includes an ascending series of terms, each including a coefficient and an angular velocity (or frequency) factor, where each term of the complex function may include real and imaginary quantities, in the form:

$$D_0 + D_1 \times W_1 + D_2 \times W_2 + D_3 \times W_3 \qquad \text{(Eq. 1)}$$

Thus, the higher-order terms of the complex function, in the general case, require four multiplications of the real and imaginary components per term, where $D_n$ is data and $W_n$ is a "twiddle" input such that $$D_n = a + jb \qquad \text{(Eq. 2)}$$

$$W_n = c + jd \qquad \text{(Eq. 3)}$$

$$D_n \times W_n = (a+jb)(c+jd) = axc + axjd + cxjb + jbxjd \qquad \text{(Eq. 4)}$$

Radix-4 processing performs four multiplications per term, or twelve multiplications for these higher-order terms $D_1 \times W_1$ through $D_3 \times W_3$. The data inputs $D_n$ and the twiddle inputs $W_n$ are supplied at separate inputs for processing in selected sequence, as later described herein.

Figure 1A:
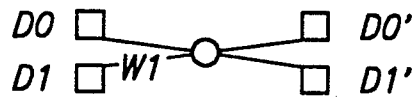
FIG. 1a is a simplified diagram of a conventional radix-2 butterfly operation.
Figure 1B:
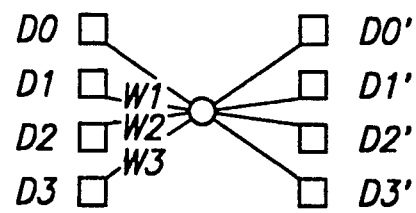
FIG. 1b is a simplified diagram of a conventional radix-4 butterfly operation.
Figure 1C:
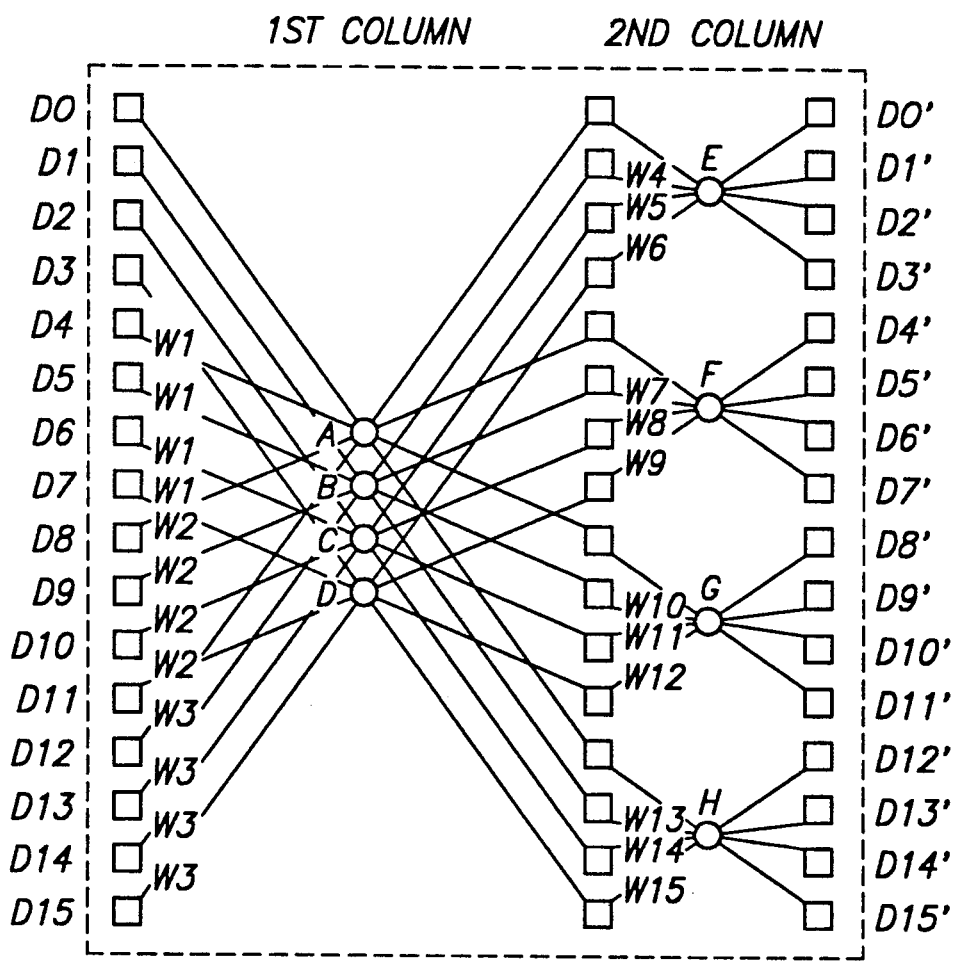
FIG. 1c is a simplified diagram of one embodiment of a quasi radix-16 butterfly operation according to the present invention.
Figure 3B:
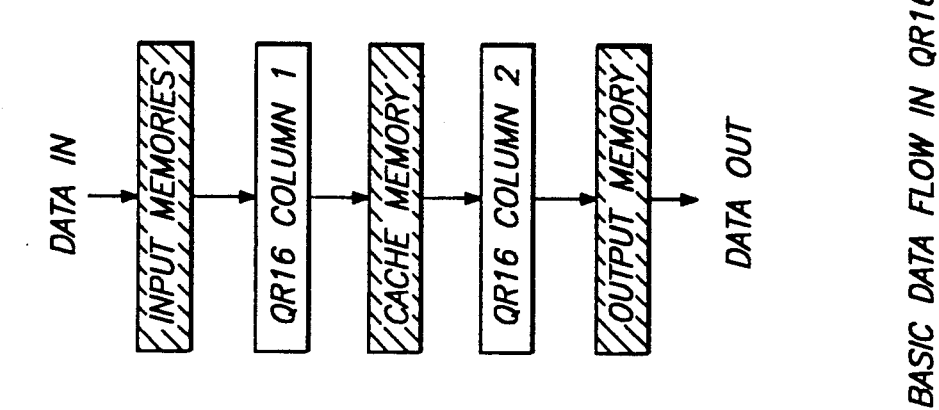
FIG. 3b is a simplified chart illustrating data flow in a quasi radix-16 butterfly processor according to the present invention.
Figure 3A:
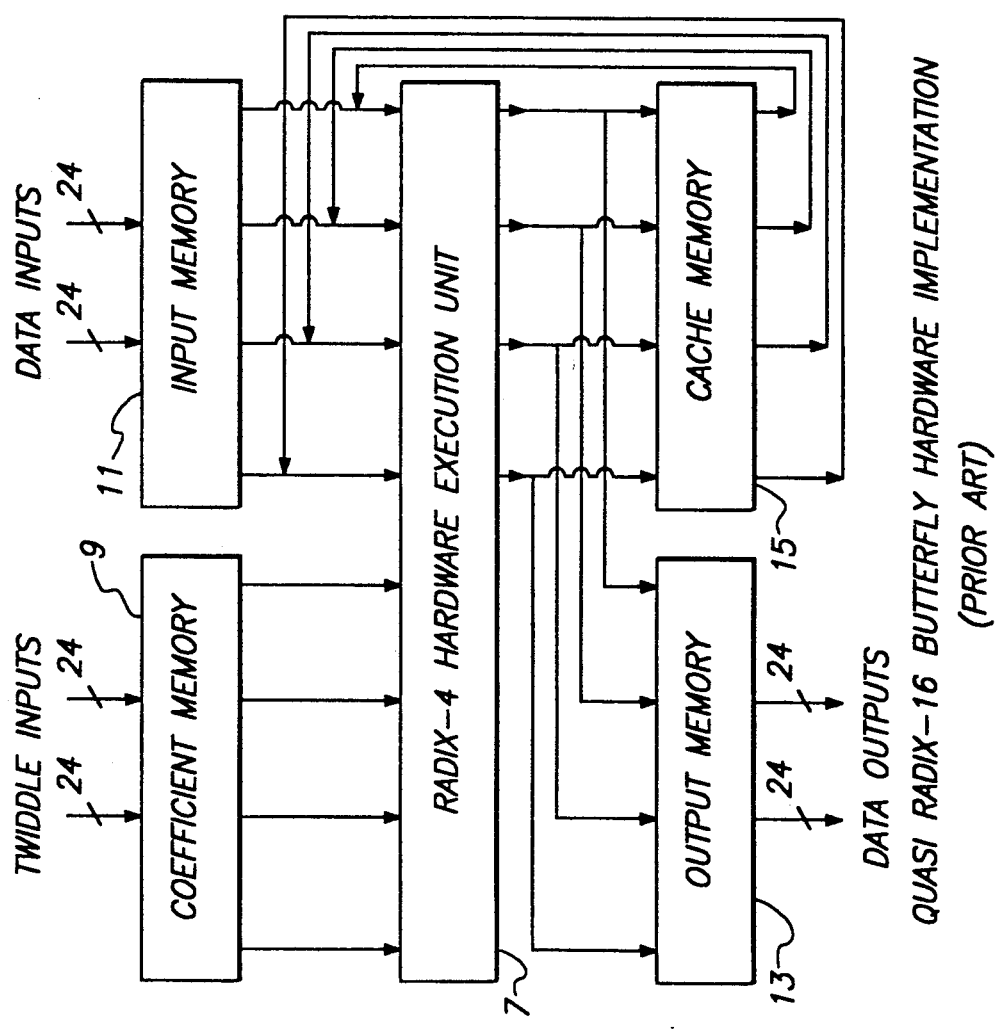
FIG. 3a is a simplified schematic diagram of a preferred embodiment of the quasi radix-16 butterfly hardware implementation according to the present invention.
Figure 9:
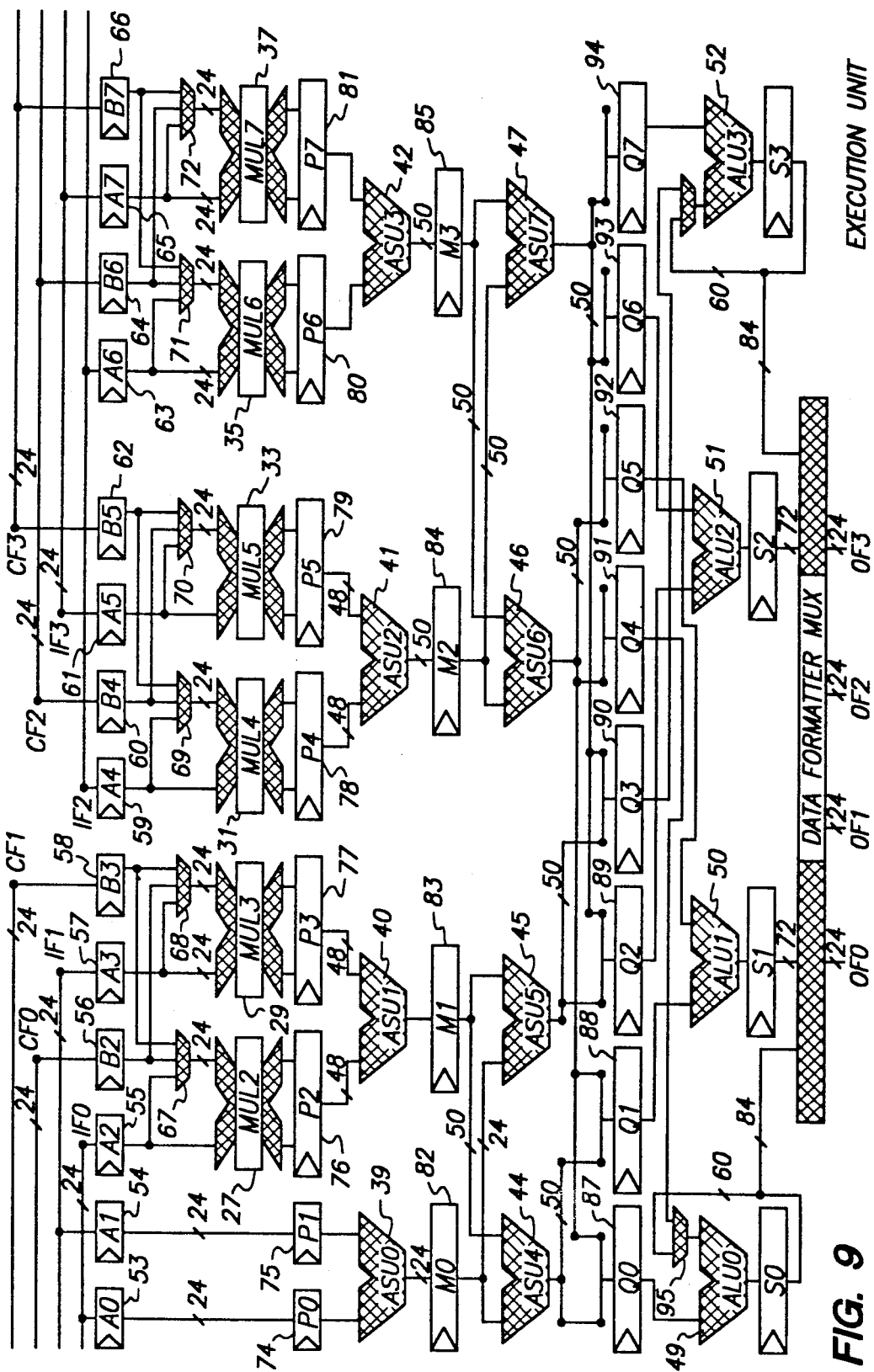
FIG. 9 is a block schematic diagram of the preferred embodiment of the circuit module radix-4 processor for operation in the quasi radix-16 processor according to the present invention.
Figure 10:
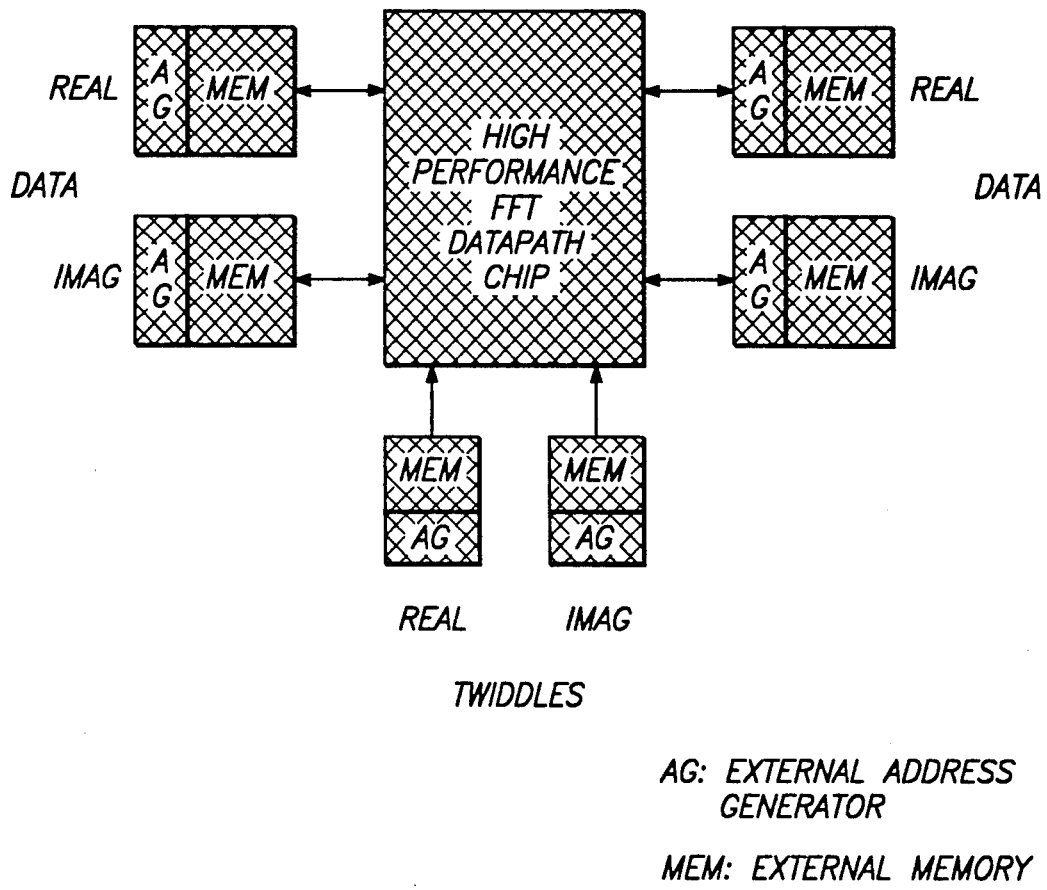
FIG. 10 is a schematic diagram of the memory and addressing circuitry associated with the quasi-radix 16 processor.

Referring now to FIG. 1c, there is shown the quasi radix-16 butterfly which includes two columns of four radix-4 butterflies each (A to D and E to H), as shown in FIG. 1c. The QR16 processor uses on-chip cache memory, later described herein, to store the 16 data outputs of the first column butterfly operations, for use in the second column butterfly operations. FIGS. 3a, 9 and 10 illustrate the hardware implementation of QR16 processor around a radix-4 butterfly execution unit. As can be seen from these figures, the QR16 processor is implemented by adding a limited amount of on-board memory 9, 11, 13, 15 to a radix-4 butterfly processor chip.

Each QR16 butterfly requires 16 input data points (D0–D15) and 15 twiddle factors (w1–w15) as shown in FIG. 1c, which takes 16 fetch cycles with 2 complex data input ports i.e., input data and twiddle inputs. Internally, eight radix-4 butterfly operations (A to H in FIG. 1c) are required. The first column uses the same data ordering as a 16-point radix-4 fast-Fourier transform (FFT) and all butterflies (A to D) have three common twiddles i.e., w1, w2, and w3. The second column of butterflies E through H require digit reversed data ordering and 12 unique twiddles i.e., w4 to w15. Without the QR16 butterfly, a 16 point radix-4 FFT would required 32 (2×16) data inputs, 24 (2×12) twiddle inputs, and 32 (2×16) data outputs, since the first column results would have to be stored in off-chip memory and be brought in again on-chip to complete the second column.

With the QR16 butterfly scheme of the present invention, it is possible to achieve as much as twice the throughput of a conventional radix-4 butterfly based processor. The higher throughput is achieved by maximizing the utilization of the datapath, as shown in FIG. 2c. It should be noted in FIG. 2c that each data fetch and output store e.g., A1* and A1*' respectively, actually takes four input/output (I/0) cycles. The 16 data points (A1*, B1*, C1* and D1*) brought on-chip are passed twice through the datapath (Pass 1-1 and Pass 1-2) before being stored in external memory. Thus, for QR16 processor of the present invention, 16×Tio=16-×Teu or Tio is equal to Teu and the datapath is continuously busy, thus indicating an ideal I/0 balanced environment.

Referring now to FIG. 4, the chart illustrates the difference between a radix-4 butterfly sequence and a QR16 butterfly sequence for 1K data points of a fast-Fourier transform. FIG. 4a shows the sequence of butterfly operations for a 1K point FFT using only radix-4 butterflies. Each shaded rectangle in FIG. 4 represents one radix-4 butterfly operation. All the butterflies of a single column are processed before the next column of butterflies are processed. Thus, a 1K point FFT can be performed in five columns by five radix-4 passes (1024=4×4×4×4×4) as shown in FIG. 4a. In contrast, a 1K point FFT can be performed in three columns by two QR16 butterfly passes and one radix-4 pass (1024=16×16×4) as shown in FIG. 4b. In FIG. 4b, the QR16 butterfly is shown as a dashed line enclosing 8 radix-4 butterflies arranged in 2 columns. In FIG. 4b, processing also proceeds column by column except only three columns are needed because of the higher radix used in the first two columns. The QR16 butterfly essentially allows two radix-4 columns to be processed at a time before the next stage. The QR16 processor advantageously includes on chip cache memory 15 for storing real and imaginary data needed for processing the two radix-4 columns in the QR16 butterfly. The present invention advantageously uses on chip memory to rearrange radix-4 butterflies to exploit data locality to increase the speed of computation. In addition to cache memory, input and output memories are included, as shown in FIG. 3a. The QR16 embodiment of the present invention includes an inherent 'pipeline' latency problem, when implemented on a pipelined radix-4 datapath. In accordance with this invention, this latency can be eliminated by interleaving the QR16 computations of two 16-point data blocks in the pipelined datapath, as later described herein. Table 1, below, illustrates the increases in processing speed that are achieved using the QR16 of the present invention, especially when operated in radix-16 mode only.

TABLE 1

| FFT Size | Passes | FFT Execution Time | | Speed Improvement Factor |
|---|---|---|---|---|
| | | QR16 | Only Radix-4 | |
| 64 | 4 × 16 | 2.56 us | 3.84 us | 1.5 |
| 256 | 16 × 16 | 10.24 us | 20.48 us | 2.0 |
| 1K | 4 × 16 × 16 | 61.44 us | 102.4 us | 1.67 |
| 4K | 16 × 16 × 16 | 245.76 us | 491.52 us | 2.0 |
| 16K | 4 × 16 × 16 × 16 | 1.31 ms | 2.29 ms | 1.75 |
| 64K | 16 × 16 × 16 × 16 | 5.24 ms | 10.48 ms | 2.0 |

Assuming: Tio = Ten = 20 ns

The Quasi-radix 16 Butterfly Implementation

Referring now to FIG. 3a and 10, in order to implement QR16 using a radix-4 module 7, a limited amount of on-board memory has to be included with this module on the same circuit chip. Memory structures 9, 11, 13 are placed at the input and output of the datapath. In addition, a cache memory 15 is also required. For complex data, the memory word width should allow for real and imaginary data components. The input and output memories 11, 13 are used for data buffering while the cache memory 15 is used to store the intermediate results of column 1 of the QR16 butterfly processing, as illustrated in FIG. 1c. FIG. 3b shows the basic data flow through the memories and the datapath. A more detailed version will be discussed later herein. Input data points are stored in the input memory 11 and the twiddles are stored in the coefficient memory 9. Then, the datapath operates on this data to accomplish the first column of QR16 butterfly processing. The results of the first column butterflies are stored in the cache memory 15 and once all the butterflies of column 1 are complete, the cache memory 15 is read to perform the second column butterflies. The final results of the second column of a QR16 butterfly are stored in the output memory 13 for transfer to off-chip memory.

Typically, multiple stage pipelined data paths are used to implement high performance FFT processors, e.g., a pipeline stage for the multiplier section, a pipeline stage for the adder section, a pipeline stage for the ALU section, and the like. In the QR16 butterfly of the present invention, there exists a data dependency between the first column and the second column of butterfly processing. The results of all first column butterflies must be available before the second column calculations can begin, i.e., with reference to FIG. 1c, the results of butterfly D must be stored in the cache memory 15 prior to the execution of butterfly E. This data dependency becomes an acute problem in pipelined data paths where the results of a particular operation are not available until a specified number of clock cycles later due to the latency of the datapath pipeline. In the QR16, this would impose a certain number of dead (or no-op) cycles into the pipeline after the last butterfly of the first column (butterfly D) and before the first butterfly of the second column (butterfly E) to avoid this data dependency.

This data dependency can be understood clearly from the timing diagram of FIGS. 5a–i which shows nine timing patterns corresponding to the memory read and write functions and the execution unit, where each of these waveforms is defined below:

(a) Input Memory Write — Input data from I/0 pins written in Input Data Memory 11;

(b) Coeff Memory Write — Twiddle data from I/0 pins written to Coefficient Memory 9;

(c) Coeff Memory Read — Input data transfer to Execution Unit 7;

(d) Input memory read — Input data transfer to Execution Unit 7;

(e) Execute — Execution Unit activity;

(f) Cache Write — Execution unit result data written to Cache Memory 15;

(g) Cache Read — Cache data transfer to Execution Unit 7;

(h) Output Memory Write — Execution unit result data written to Output Data Memory 13; and (i) Output Memory Read — Output data read to I/0 pins.

Referring now to the graph of FIGS. 5a–i, A and B refer to two different QR16 butterfly data blocks. A1 and A2 refer to the first and second columns of the A block respectively. Similarly, B1 and B2 refer to the first and second columns of the B block, as illustrated in FIG. 7b. In the timing waveforms of FIGS. 5a–i, the shaded areas on a waveform indicate no activity for that function for the specified duration, whereas unshaded areas indicate processing activity.

The timing diagram in FIGS. 5a–i assumes Teu=Tio, i.e., pipeline cycle time is equal to I/0 cycle time. First, the input data for block A is written to the input memory 11; this takes sixteen (Tio or Teu) cycles to bring in the sixteen data points of block A and is shown on the Input Memory Write pattern (a). Similarly, the twiddles for block A are also written to the coefficient memory 9 in sixteen cycles Note that the Coeff Memory Write (b) is delayed 16 by eight cycles with respect to the Input Memory Write (a). This situation arises because the Coeff Memory Read A1 only empties three memory locations. As will be shown later, the twiddle sequencing requires retransmission of three twiddles for the first column butterflies. Therefore, to keep the input 11 and coefficient 9 Memory of the same depth, the Coeff Memory Write (b) is delayed 16 by eight cycles with respect to the Input Memory Write (a). Two cycles prior to the completion of Input Memory Write (a), the execution unit 7 accesses the input data memory 11 (Input Memory Read (d)) and the coefficient memory 9 (Coeff Memory Read (c)) to get the data for the first column butterflies of block A. Note that the read process only takes eight cycles 16 since the read bandwidth is twice the write bandwidth for these memories 9, 11, as later described. Therefore, two cycles are required to fetch the data for one radix-4 butterfly from the memories 9, 11. Hence, the execution unit activity can begin two cycles after the Coeff (c) and Input (d) Memory Read, as shown on the Execute waveform (e). Each column of a QR16 butterfly requires that eight cycles be initiated since there are four butterflies in each column. Note that the transitions shown on the Execute waveform (e) only indicate the beginning of a new column of butterflies and not the total execution time of a column through the pipeline. The radix-4 datapath on which the QR16 of the present invention is implemented has an execution latency of six cycles 18. Therefore, the results of A1 start getting written into the cache memory six cycles 18 after the execution (A1) is begun. The Cache Read (A1/A2) (g) is initiated as soon as all the results of A1 are available. The twiddles for column 2 are accessed at the same time (Coeff Memory Read A2) (c) from the Coefficient Memory 9. Execution for column 2, i.e., A2 can be started two cycles later. Six cycles 20 after the start of A2 execution, the results of these computations can begin to be written (h) into the output memory 13, and the data in the output memory 13 can be read (i) to the I/0 pins (Output Memory Read). For the output memory 13, the write bandwidth is twice the read bandwidth, as described later herein, and thus the results of a column of butterflies are written in eight cycles and read in sixteen cycles. The sequence of operations described above is repeated for block B and every other block thereafter. It should be noted, however, that the shaded areas in the Execute timing waveform (e) indicate dead time periods 22 attributable to this data dependency in the processing through the QR16. Specifically, for this datapath, a dead time period 24 consisting of seven Teu (or Tio) cycles would be introduced into the pipeline between the A1 and A2 execution.

Figure 7A:
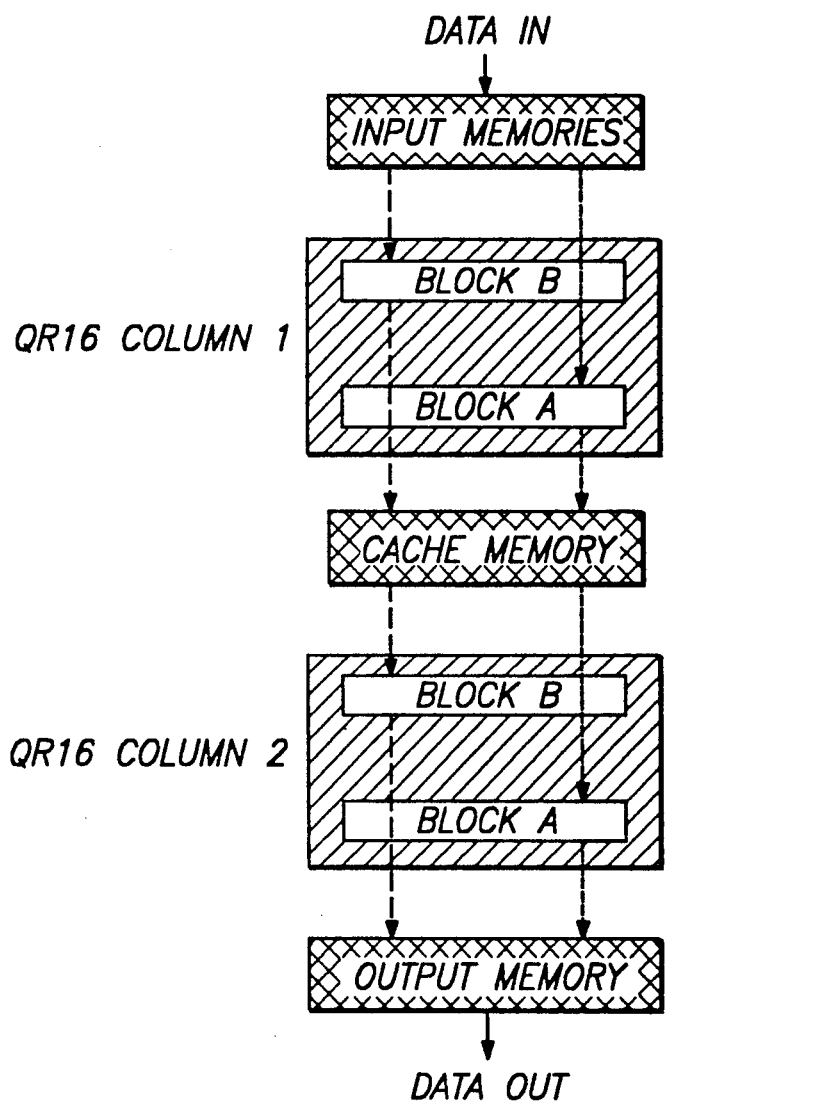
FIG. 7a is a simplified diagram illustrating the data flow through an interleaved quasi-radix-16 scheme as illustrated in FIG. 7b according to the present invention.
Figure 7C:
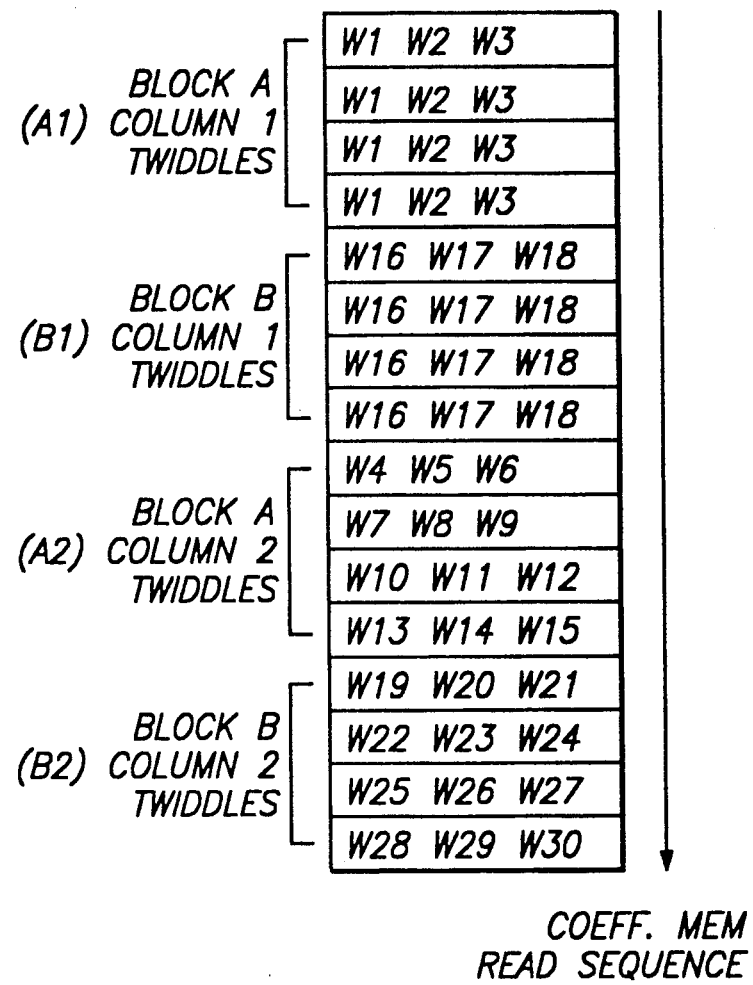
FIG. 7c is a chart illustrating the address orientations of twiddle inputs within on-chip memory in hexadecimal notation.

However, in accordance with the present invention this latency can be eliminated by interleaving the QR16 computations of two 16-point blocks in the datapath. To accomplish this, twice as large on-board memories are used to store two 16-point data blocks on-chip at the same time, as illustrated in the timing diagram of FIG. 6 which shows the timing diagram for two interleaved QR16 butterfly computations. The timing waveforms shown in FIGS. 6a-i have the same definitions as in FIGS. 5a-i, and A and B again refer to two QR16 butterfly data blocks. The input data for the two QR16 butterfly data blocks (A and B) is written (a) to the input data memory 11 sequentially, and this takes 32 (2×16) cycles. However, twiddle data for both block A and B is written (b) to the coefficient memory 9 in a scrambled fashion, which will be explained later, and is again delayed 26 by sixteen cycles with respect to the Input Memory Write (a). Once the input data for a pair of QR16 blocks is available in the input data memory 11, the execution unit 7 reads the input data memory 11 to start the first column block A computations (e) (A1). As soon as the data for the last butterfly of A1 has been read, the first column of block B computations are initiated. The sequence of operations just described for interleaved QR16 butterflies is illustrated in FIG. 7a, and a more detailed version of the computation is illustrated in FIG. 7b. It should be noted in FIG. 6 that as soon as B1 computations are complete, the results of A1 are already available for fetching from the cache memory 15 to compute A2. As this computation is completed, the results of B1 are already available in the cache memory 15 for computing B2. Finally, this process can be repeated for the next pair of QR16 data blocks, and so on. This interleaving scheme in accordance with the present invention requires 32 storage locations in all the on-board memories 9, 11, 13 and 15. As can be seen from the Execute timing waveform (e) in FIG. 6, there are now no no-op or shaded areas 28 on this waveform, thus indicating a continuously busy datapath. FIG. 7c shows the twiddle or coefficient sequence for this interleaved scheme, as explained below in detail later herein in connection with the addressing for the coefficient memory 9.

Having defined the basic memory requirements for QR16 and having discussed the interleaved QR16 scheme, the details of each of the on-board memories will now be described. The cache memory 15 is a conventional double-buffered structure or dual-port memory to allow concurrent read/write for the pipelined datapath. As indicated in FIG. 6, to keep the datapath pipeline continuously busy with the interleaving scheme, the cache memory 15 must be written with the results of B1 and at the same time the results of A1 need to be read. The cache memory 15 is preferably comprised of four banks 24 bits wide and 16 words deep. Therefore, the cache memory 15 may have 32 complex data words (48 bits) locations or 64 real data word (24 bits) locations. The word width is governed implemented. The cache memory 15 must be able to supply and accept two complex words every clock cycle. The cache memory addressing can be accomplished for example, by a four-bit counter and a few multiplexers (mux). Some conventional counter and mux logic supports sequential data ordering as well as conventional digit-reversed data ordering. As mentioned above, the results of the first column of a QR16 butterfly are stored in digit-reversed order and read in sequential order for the second column calculations.

Input data memory 11 and output data memory 13 placed at the input and output of the datapath, respectively, are of conventional design and used for data buffering and concurrent read/write operation. Both the input and output memories 11, 13 are also four banks 24 bits wide and 16 words deep having 32 complex data words (48 bits) locations or 64 real data word (24 bits) locations. The memory buffering structures are used here for the reasons that there is a speed gap between slow I/0 and a fast datapath, and that there is a need for convenient simultaneous read/write operations. On the proposed datapath, a radix-4 butterfly can be executed every two pipeline cycles. This implies that two data quantities must be supplied every pipeline cycle (2 data per cycle×2 cycles=4 data values per radix-4 butterfly) if the data and twiddle have separated dedicated I/0 ports. However, it is generally not possible to supply two data values every cycle with just one data and one twiddle port if the I/0 cycle time is the same as the pipeline cycle time. This is the speed gap that exists which is eliminated by using memory structures 9, 11, 13 at the input and output of the datapath. The timing shown in FIG. 6 assumes one common clock between I/0 and execution unit in order to minimize the complexity of the control structure. With a common clock, it becomes necessary to have the read bandwidth of the input memory 11 be twice the write bandwidth and vice versa for the output memory 13. The timing shown therefore avoids boundary conditions in the memories for ease of implementation. Even if different clocks are used for the I/0 and the datapath, the use of memory structures at the input and output eases the interface problem between external circuitry and the internal datapath.

In addition to the input and output memories 11, 13, there is also a coefficient memory 9 which is used for storing the twiddle data, as shown in FIG. 3a. The coefficient memory 9 is preferably comprised of four banks 24 bits wide and 20 words deep. Thus, the coefficient memory 9 may have 40 complex data words (48 bits) locations or 80 real data word (24 bits) locations. However, only 30 locations are used to store two sets of 15 twiddles corresponding to the pair of QR16 data blocks resident in the input memory 11 for the interleaving scheme. The coefficient memory 9 structure is otherwise similar to the input and output memories 11, 13 previously described. The coefficient memory 9 also has a read bandwidth twice that of the write bandwidth, and is of conventional configuration for supporting non-sequential read addressing. It should be noted that three twiddle factors, W1, W2, and W3, are shared across all radix-4 butterflies in the first column of data block A, as shown in FIG. 7b. For the second column butterflies of data block A, 12 unique twiddles, W4 to W15, are read from the coefficient memory 9 sequentially. In the interleaving scheme according to the present invention as illustrated in FIG. 7c, W1 to W3 are read 4 times for the first column calculation of data block A (A1) and then W16 to W18 are read 4 times for the first column calculation of data block B (B1). Then W4 to W15 are read sequentially for second column calculations of data block A (A2) and W19 to W30 are read similarly for second column calculations of data block A (A2) and W19 and W30 are read sequentially for second column of data block B (B2). The required read sequence for the twiddles in the interleaving scheme of the present invention is shown more clearly in FIG. 7c which indicates the address locations of the twiddle inputs (numbered in hexadecimal notation). The coefficient memory 9 only supports read-retransmission from the required locations, and the combined sequence between the first 15 and the second 15 twiddles is supported by an external address generator 21, as illustrated in FIG. 10.

Figure 8:
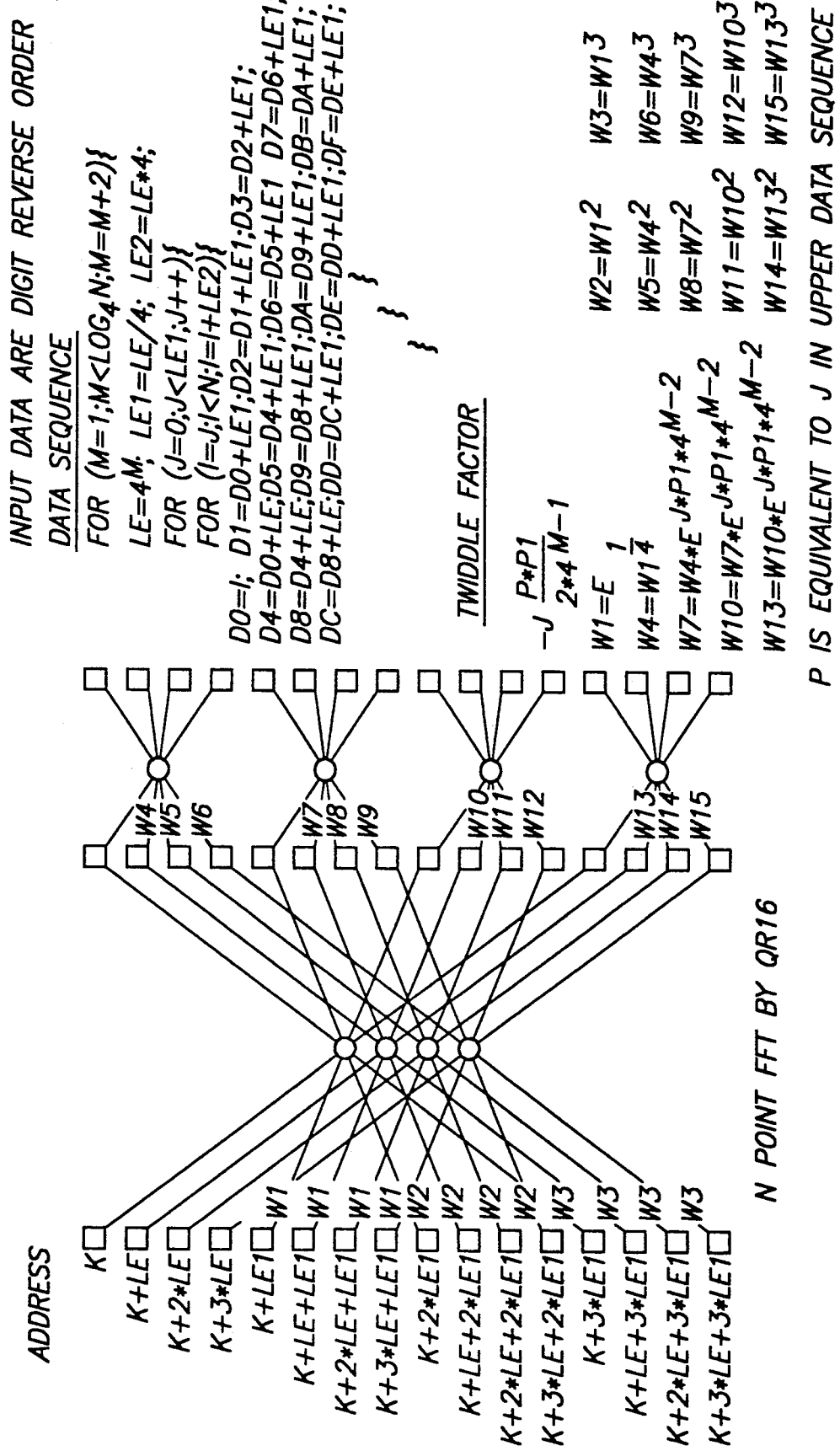
FIG. 8 is a simplified diagram for performing a N-point Fast Fourier Transform with a quasi radix-16 butterfly of the present invention illustrating the generic notation.

In the QR16 according to the present invention, two levels of address generation are required. First, a given size FFT must be composed of QR16 blocks and the appropriate number of passes of radix-16, radix-4 and radix-2 must be calculated. The equations for data and twiddle sequencing to perform an N point FFT by QR16 are shown in FIG. 8. The data and twiddle addressing at this block level, where a pair of 16-point data blocks are brought from external memory (MEM) 32, 34 and 36, is done by an off-chip conventional address generator (AG) 21, 23, 25, as shown in FIG. 10. As previously described, the external AG 21, 23, 25 must combine the twiddles of two QR16 blocks in the manner shown in FIG. 7c. At the second level, the address generation is required within the pair of data blocks and this, as previously discussed, is handled on-chip by conventional addressing circuitry associated with each on-board memory 9, 11, 13 and 15.

Referring now to FIG. 9, there is shown a schematic diagram of processor circuitry according to the present invention for operation in the quasi-radix-16 embodiment. This circuitry and the datapath therethrough can accomplish a radix-4 complex butterfly every two cycles using 6 multipliers 27, 29, 31, 33, 35 and 37, and with 3 stages of adders 39-42, 44-47 and 49-52, to permit a 16-cycle QR16 butterfly processing of data and twiddles applied to input registers 53-66. The data bandwidth required by this datapath for the QR16 butterfly is achieved by doubling the read/write bandwidth of the on-board memories. Thus, on each execution cycle, the on-board memories can supply/accept two sets of two complex numbers. Thus, with reference to the Eq. 1, above, the data for processing successively higher-order terms is arranged generally from left to right in that the $D_0$ data inputs are supplied via data registers 53, 54, the $D_1$ data inputs are supplied via data registers 55, 56, the $D_2$ data inputs are supplied via data registers 57, 58 and the $D_3$ data inputs are supplied via data registers 59, 60. Similarly, the $W_1$ twiddle inputs are supplied via data registers 61, 62, the W2 twiddle inputs are supplied via data registers 63, 64, and the W3 twiddle inputs are supplied via data registers 65, 66. The groups of multiplexers 67, 68 and 69, 70 and 71, 72 are cross connected to facilitate the complex cross-product multiplication in the respective multipliers during alternate cycles to yield products that are stored in registers 74-81. The initial products are arithmetically combined in adder/subtractor units 39-42 and stored in the registers 82-85. The outputs of registers 82-85 again combined in a second stage of adder/subtractor units 44-47 and stored in data registers 87-94. The data in registers 87-94 is supplied via multiplexers 95-96 to the arithmetic logic units 49-52. Registers 98-102 are coupled to receive and store the results from the arithmetic logic units 49-52. The outputs of these registers 98 $\alpha$ 102 are coupled to a data formatter multiplexer 104 that organizes the data from the registers for output to the memories in the desired 24 or 48 bit format. Thus, the complex data for $D_1W_1$ is processed in multipliers 27, 29 during first and second cycles, the complex data for $D_2W_2$ is processed in multipliers 31, 33 during first and second cycles, and the complex data for $D_3W_3$ is processed in multipliers 35, 37 during first and second cycles. Ultimately, the processed complex outputs (say, from first column processing appear at outputs 106, 107 for D0 in one cycle, and at outputs 108, 109 for $D_1$ in the one cycle, and appear at outputs 106, 107 for D2 in the second cycle, and at outputs 108, 109 for $D_3$ in the second cycle. With the aid of cache memory 15 on-chip, these outputs from first-column processing are stored to provide the data inputs for second-column processing according to the quasi radix-16, as previously described. This circuit also supports radix-2 and radix-4 butterfly processing operations. A radix-2 butterfly can be done in a single cycle in this circuitry, but I/0 only supplies half of the required data in one cycle, which therefore limits the radix-2 processing to 2 cycles. Radix-4 butterfly processing can be executed in 2 cycles, but for the same reason, it takes 4 cycles to read the data. In this circuitry, the QR16 butterfly is the only operation that achieves 100% execution utilization, as shown in FIGS. 6a-i. More specifically, the QR16 according to the present invention is most efficient if the FFT size is an integral power of 16, for example 256 (16×16), 4K (16×16×16), as illustrated in Table 1 above, but is also capable of speeding up the computation by 30 to 50% for other FFT sizes. Assuming a 20 nanoseconds I/0 rate and a 40 nanoseconds radix-4 butterfly, the QR16 according to the present invention performs a 1K FFT in 61.4 microseconds compared with 102.4 microseconds if only radix-4 butterfly passes were used on the same circuitry. Performance improvements due to the QR16 according to the present invention for other FFT sizes are also tabulated in Table 1, above.

Referring now to FIGS. 11-14, there is shown a pictorial representation of the preferred memory storage scheme for the coefficient, input, output and cache memories 9, 11, 13 and 15. Each of the memories 9, 11, 13 and 15 comprise a left bank of complex memories (A+jB) and a right bank of complex memories (C+jD). The memories 9, 11, 13 and 15 preferably have 20 row addresses designated in the top row of each chart. Therefore, at each address one word may be written the left bank and another word may be written in the right bank of complex memory. The charts of FIGS. 11-14 detail the write and read sequences for words written the respective memories. For example, as shown in FIG. 11, the write sequence for Radix 2, 4 or 16 (a) in the input data memory 11 writes word 0 at the left bank (A+jB) of address 0, word 1 at the right bank (C+jD) of address 0, and word 2 at the left bank (A+jB) of address 1. Words 3-1f are similarly written according to the write sequence indicated in FIG. 11a. Exemplary schemes for reading and writing data in the memories 9, 11, 13 and 15 are shown in remaining charts of FIGS. 11-14. The data is preferably retrieved and stored in the memories 9, 11, 13 and 15 with address sequences ordered linearly or in some form of reverse addressing. As noted above, the data in the Coefficient Memory 9, may be ordered in a scrambled fashion to permit 100% use of the execution unit 7 as described above with reference to FIG. 6.

What is claimed is:

1. In a digital signal processor in which the I/O data bandwidth, memory capacity and execution unit throughput are each limited and mutually dependent, and the input/output ("I/O") data bandwidth and the execution unit throughput are comparable, a processor for performing fast Fourier transforms comprising:
    an input memory having inputs and outputs for storing data;
    an output memory having inputs and outputs for storing data;
    an internal cache memory having inputs and outputs for storing data;
    a coefficient memory having inputs and outputs for storing data; and
    an execution unit having inputs and outputs for performing logical and arithmetic operations on real and imaginary numbers, the outputs of said execution unit coupled to the inputs of the output memory and the internal cache memory, the inputs of said execution unit coupled to the outputs of the input memory, the outputs of the coefficient memory and the outputs of the internal cache memory;
    wherein the internal cache memory is of a size sufficient to hold the output of the execution unit and which corresponds to the bus widths of the input memory and the output memory, such that the execution unit is continuously active and not limited by the bus widths of the input memory or the output memory.

2. The processor of claim 1, wherein the input memory, the output memory, the internal cache memory and the coefficient memory are 32 words deep.

3. The processor of claim 1, wherein the internal cache memory is of a size sufficient to supply and accept two words every clock cycle.

4. The processor of claim 1, wherein the input memory and the coefficient memory have an input bus width which is half of their output bus width, and the output memory has an input bus width which is twice its output bus width.

5. The processor of claim 1, wherein the execution unit further comprises:
    a plurality of input registers having inputs and outputs for storing data;
    a plurality of multipliers having inputs and outputs for performing cross product multiplication, the inputs of said plurality of multipliers coupled to the outputs of said registers;
    a plurality of arithmetic logic units having inputs and outputs for performing local and arithmetic operations on the data input, the inputs of said arithmetic logic units coupled to the outputs of the multipliers; and
    a multiplexer having inputs for formatting the data output by the arithmetic logic units, the inputs of said multiplexer coupled to the outputs of the plurality of arithmetic logic units.

6. The processor of claim 5, wherein the plurality of arithmetic logic units comprise:
    a first stage of arithmetic logic units having inputs and outputs for generating the sum of the data input, the inputs of said first stage coupled to the outputs of the multipliers;
    a second stage of arithmetic logic units having inputs and outputs for generating sums of the data input, the inputs of said second stage coupled to the outputs of the first stage; and
    a third stage of arithmetic logic units having inputs and outputs for performing logical and arithmetic operations, the inputs of said third stage coupled to the outputs of the second stage.

7. The processor of claim 1, wherein the input memory, the output memory, the internal cache memory, the coefficient memory and the execution unit are constructed on a single chip.

8. The processor of claim 1, wherein the execution unit is a radix-4 processor.

9. In a digital signal processor in which the input/output "(I/O") data bandwidth, memory capacity and execution unit throughput are each limited and mutually dependent, and the I/O bandwidth and execution unit throughput are comparable, a method for performing a sequence of fast Fourier transforms, or FFT's, in a processor having an execution unit, an input memory, an output memory, a coefficient memory and an internal cache memory which is of a size sufficient to hold the output of the execution unit and which corresponds to the bus widths of the input memory and the output memory, said method comprising the steps of:
    storing data in the input memory and the coefficient memory for a first FFT and a second FFT;
    reading data from the output memory and the coefficient memory for the first FFT;
    performing a first set of calculations for the first FFT on the data from the input memory and the coefficient memory with the execution unit;
    storing the result of the first set of calculations for the first FFT in the internal cache memory;
    reading data from the input memory and the coefficient memory for the second FFT;
    performing a first set of calculations for the second FFT on the data from the input memory and the coefficient memory with the execution unit;
    storing the result of the first set of calculations for the second FFT in the internal cache memory while simultaneously reading the result of the first set of calculations for the first FFT from the internal cache memory;

performing a second set of calculations for the first FFT on the data from the internal cache memory, the input memory and the coefficient memory with the execution unit;

storing the result of the second set of calculations for the first FFT in the output memory while simultaneously reading the result of the first set of calculations for the second FFT from the internal cache memory;

performing a second set of calculations for the second FFT on the data from the internal cache memory, the input memory and the coefficient memory with the execution unit; and storing the result of the second set of calculations for the second FFT in the output memory, wherein the correspondence of the bus widths of the internal cache memory, the input memory and the output memory is such that the execution unit is continuously active and not limited by the bus widths of the input memory of the output memory.

10. The method of claim 9, wherein the input memory and the coefficient memory have an input bus width which is half of their output bus width, such that the steps of reading data from the input memory and the coefficient memory further comprise reading the data at a rate twice as fast as the data is stored in the input memory and the coefficient memory, and the output memory has an input bus width which is twice its output bus width, such that the step of storing the result of the second set of calculations for the second FFT in the output memory further comprises writing the result to the output memory at a rate twice as fast as the data can be read from the output memory.

11. The method of claim 9, wherein the steps of storing or reading the results of calculations in or from the internal cache memory further comprise storing or reading two words in every clock cycle.

12. The method of claim 9, wherein the processor is a radix-4 processor, such that the steps of performing a first set of calculations for the first FFT, performing a first set of calculations for the second FFT, performing a second set of calculations for the first FFT, performing a second set of calculations for the second FFT are all performing radix-4 calculations, and the result of the second set of calculations for the second FFT is the equivalent of the result of a radix-16 calculation on the data stored in the input memory and coefficient memory so that the radix-4 processor is operated as a quasi radix-16 processor.

* * * * *